United States Patent Office
3,812,175
Patented May 21, 1974

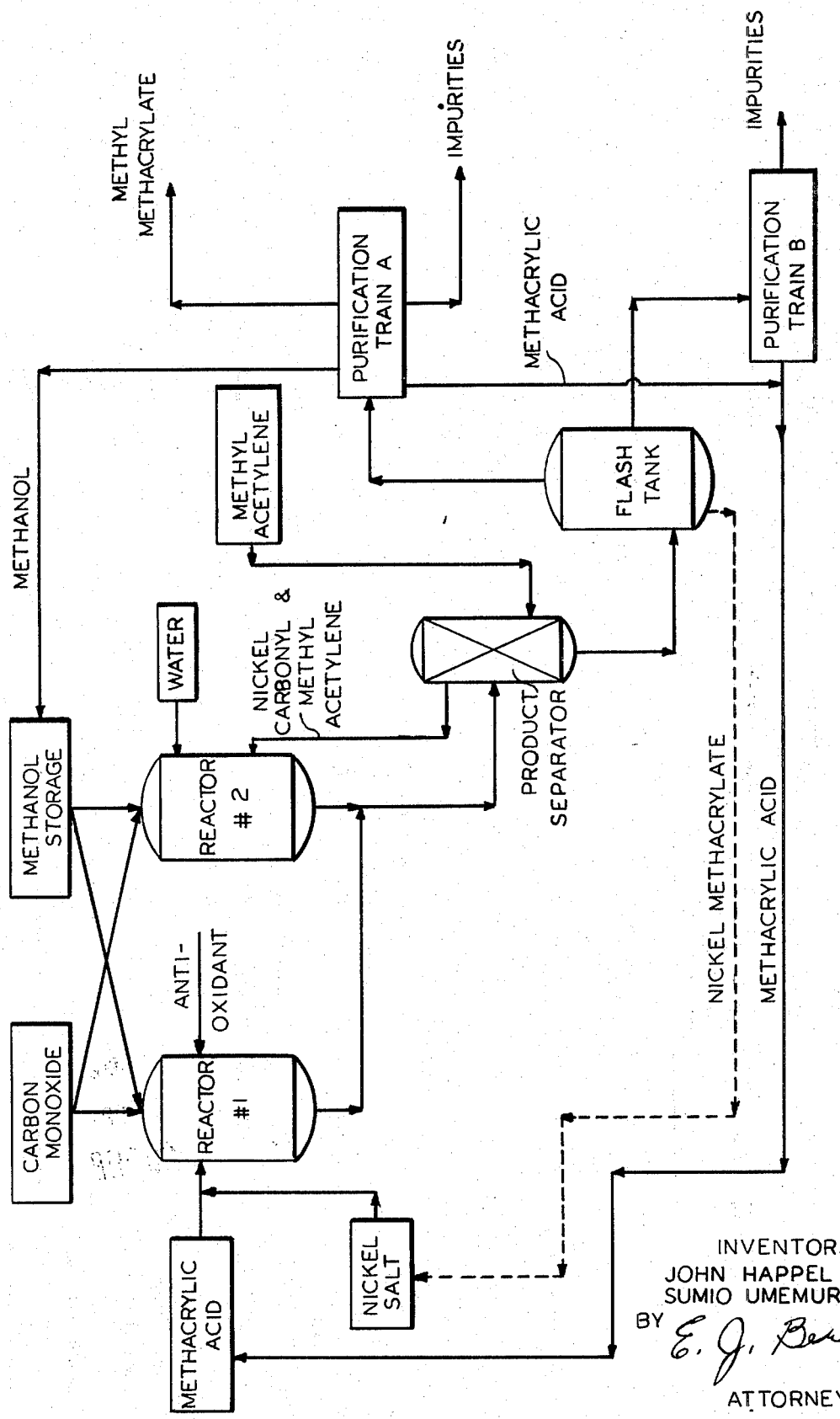

3,812,175
MULTIPLE STAGE CARBONYLATION PROCESS
John Happel, Hastings-on-Hudson, N.Y., and Sumio Umemura, Ube-shi, Japan, assignors to National Lead Company, New York, N.Y.
Filed Jan. 26, 1970, Ser. No. 5,612
Int. Cl. C07c 51/14, 69/54
U.S. Cl. 260—486 AC    6 Claims

ABSTRACT OF THE DISCLOSURE

A carbonylation process for production of methyl methacrylate using a two reaction system in which each of the individual reaction systems supplies a reagent necessary for the other reaction system, more particularly, there is employed a first reaction system which produces nickel carbonyl from a nickel salt and carbon monoxide in the presence of a methanol and methacrylic acid solvent system, the latter being consumed by esterification with methanol, and being replaced by by-product methacrylic acid produced in a second reaction system which produces methyl methacrylate and methacrylic acid from methyl acetylene, carbon monoxide and the nickel carbonyl from the first reaction system in the presence of a methanol and water solvent system, the methacrylic acid being passed to the first reaction system, and the nickel carbonyl consumed in the reaction to make methyl methacrylate being replaced by nickel carbonyl made in the first reaction system, all the above system being carried out under critical conditions of pressure, temperature, concentrations, feed and flow rates and recycle control.

The invention relates generally to a carbonylation process for producing high yields of methyl methacrylate from methanol and methyl acetylene, and more particularly comprises a carbonylation process in which two separate reaction systems (reactors) are used in series, each supplying a necessary reagent to the other; thus in the first reactor nickel carbonyl is formed using a nickel salt and carbon monoxide in the presence of methanol and methacrylic acid (from the second reactor) as solvent, and in the second reactor there is produced methyl methacrylate and by-product methacrylic acid using carbon monoxide, nickel carbonyl (from the first reactor), and methyl acetylene in the presence of methanol and water as solvent.

It is one object of the present invention to provide a commercially practical process for producing a high yield of methyl methacrylate by carbonylation of methyl acetylene.

It is another object of the present invention to provide a continuous process having separate but interrelated reaction systems, whereby in each reaction system there is produced a necessary reagent for the other reaction system.

It is another object of the present invention to carry out carbonylation reactions using a two reactor system, the two reactors being arranged in series relationship to each other, and whereby each one of the two reactors supplies as a sole source a necessary reagent to the other reactor.

It is a further object to produce methyl methacrylate in a two reactor system wherein nickel carbonyl is formed in one (first) reactor from nickel salts and carbon monoxide in the presence of methacrylic acid; the nickel carbonyl is passed to another (second) reactor, wherein it is contacted with carbon monoxide, methyl acetylene and methanol to produce methyl methacrylate and by-product methacrylic acid which is passed into the first reactor.

Other and further objects of the invention will be apparent from the detailed description of the invention presented hereinafter.

It is known to subject methyl acetylene to a carbonylation reaction in the presence of an alkanol, water, carbon monoxide and nickel carbonyl. The reaction can be either "stoichiometic" or "catalytic" in nature and the two reaction mechanisms can proceed together in the same reacting mixture. The catalytic reaction is much to be preferred and efforts have been made to increase its predominance. By this method, for instance, carbon monoxide, methanol and methyl acetylene yield methyl methacrylate. Since methyl acetylene is unsymmetrical about its triple bond, it can, however, and usually does upon carbonylation, produce two different molecular configurations. Hence, when methyl acetylene is carbonylated, and esterified with methanol, methyl methacrylate $$(CH_2=C(CH_3)COOCH_3)$$

and methyl crotonate  ($CH_3CH=CHCOOCH_3$), are produced.

The unique feature of this invention is the discovery that the carbonylation of methyl acetylene can be advantageously carried out using two separate but interrelated reactors arranged in series. The process of the invention comprises methyl methacrylate production by a two reactor system. Specifically one reactor produces nickel carbonyl and while the other reactor produces methyl methacrylate and methacrylic acid. In a special embodiment of the invention a further transferable product, namely, nickel methacrylate, is produced. The nickel carbonyl produced in the first reactor or reaction zone is passed into the second reactor or second reaction zone and the methacrylic acid produced in the second reactor (zone) is passed into the first reactor (zone); the two separated but distinct reaction zones being thus interrelated. Operating in this manner, it is possible under selected conditions to produce methyl methacrylate without supplying either (1) nickel carbonyl or (2) methacrylic acid to the system. Preferably both reagents (1) and (2) are produced in their respective reactors in the quantities as required in the reactor in which each is a required reagent, otherwise, it may be necessary to adjust the quantities to those required for optimum production conditions in each reactor. It is also possible, if desired, to produce either excess nickel carbonyl or methacrylic acid in the respective reactors, a part of which can be withdrawn for other uses.

To describe the process of the invention in greater detail, the process requires the use of two separate reactors or reactor chambers. They are operated in series. In Reactor No. 1, nickel carbonyl is made from a nickel salt and carbon monoxide. Methacrylic acid and methanol are present and required as solvent, and the acid is consumed by esterification with the methanol. In Reactor No. 2, the carbonylation reaction of methyl acetylene gives methacrylic acid and methyl methacrylate. A part of the nickel carbonyl, which acts as a catalyst in these reactions is decomposed. It is contemplated and in fact is a special feature of this invention, that the nickel carbonyl produced in Reactor No. 1 equals the nickel carbonyl decomposition in Reactor No. 2, and the methacrylic acid produced in Reactor No. 2 equals the consumption of methacrylic acid in Reactor No. 1. By using the combination of two reactors, it is possible to produce methyl methacrylate from methyl acetylene, carbon monoxide, and methanol without supplying either make-up nickel carbonyl or methacrylic acid to the system.

The necessary balance (preferred operational ratios) of the two reactors for such an over-all system may be represented in an equation as follows:

$$\text{(Reactor No. 1)} \frac{\text{Nickel carbonyl produced}}{\text{methacrylic acid consumed}} = \frac{\text{Nickel carbonyl consumed}}{\text{methacrylic acid produced}} \text{(Reactor No. 2)}$$

In order to accomplish this or to approach the desired ratio, it has been found that there are critical factors for operation of Reactors 1 and 2.

Reactor No. 1 can be operated at total pressures from about 800 up to about 1800 p.s.i.g. with preferred operating pressures around 1200–1500 p.s.i.g. This total pressure in Reactor No. 1 consists of the partial pressure of carbon monoxide and to a minor extent the vapor pressure of the reaction mixture. The rate of nickel carbonyl production is directly proportional to the partial pressure of carbon monoxide in the system. Thus, within limits, the nickel carbonyl formation rate can be controlled by varying the carbon monoxide pressure. If the carbon monoxide pressure is too low, the amount of nickel carbonyl produced may be insufficient for operation of Reactor No. 2 and there is a resulting efficiency problem in the operation of Reactor No. 2. Excessive pressure is unnecessary and creates plant hazards peculiar to high pressure reactions. Excessively high pressures of carbon monoxide may also cause formation of polymer by-products. If nickel carbonyl in excess of that needed in Reactor No. 2, is produced in Reactor No. 1, a safety problem may be created since storage for the excess material must be provided. Nickel carbonyl is well known to be highly toxic and must be handled, transported and stored with extreme caution.

Reactor No. 1 is preferably operated at temperatures of about 360° to 400° F. The effect of temperature on the formation rate of nickel carbonyl is relatively great. Below about 360° F. the reaction to form nickel carbonyl proceeds at a slow and uneconomical rate. Excessive amounts of undesirable by-products are formed as the temperature is raised substantially above 400° F.

The reaction system of Reactor No. 1 produces nickel carbonyl in a liquid phase system and this liquid phase should be as homogeneous as possible, i.e., there should be little or no formation of precipitate during operation. The solubility of the nickel salt, for example nickel methacrylate, is affected by a number of factors. These include, among others, the amount of water, methanol, and methacrylic acid as well as the temperature.

It appears that there is required in Reactor No. 1 at least a small amount of water, up to a maximum of 10%. However, no water need in fact be added as sufficient water is supplied by the esterification reaction taking place therein. The amount of methacrylic acid fed into Reactor No. 1 is adjusted to compensate for the amount of the acid consumed by esterification and the ratio of methanol to methacrylic acid is maintained at all times at least at 2 to 1 or higher.

The proper operation of Reactor No. 2 depends on the critical control of the presence of water. The water should, if possible, be added as a separate stream and at a carefully pre-selected, controlled, relatively slow rate. If the water is added with the nickel carbonyl and/or the methanol, there is a tendency to form a non-homogeneous reaction mixture, which is undesirable. It has been found that at least 10 weight percent water is required for good operation. Increasingly higher levels of water may be employed depending on the desired rate of production of methacrylic acid, for example 50 weight percent water can be successfully employed.

A pressure of 700–800 p.s.i.g. up to 1500 p.s.i.g. can be employed in Reactor No. 2. Temperatures of 340° to 400° F. can be employed in this step. At temperatures of 400° F. and above of operation some polymerization of the methacrylate products may be encountered and these higher temperatures are to be avoided.

It is desirable to incorporate polymerization inhibitors in the reaction mixture. Typical polymerization inhibitors such as pyrogallol, hydroquinone, resorcinol, beta-naphthol and the like which prevent free radical polymerization are thus utilized.

Using this process, a maximum yield of methyl methacrylate is obtained with a minimum production of by-products. The methyl methacrylate finds very extensive commercial use as the monomer for making polymethyl methacrylate polymers as well as for copolymerization with other unsaturated compounds as comonomers.

It is an additional feature of the invention that methacrylic acid, can be made by the carbonylation reaction in a separate stage, i.e., as described above for Reactor 2. Thus, methacrylic acid can be produced by carbonylation of methyl acetylene in a mixed methanol and water solvent at the temperatures and pressures described hereinabove. By using the temperatures defined hereinabove a high level of catalytic activity and a high rate of reaction are achieved. With the use of high pressures, i.e., 700 p.s.i.g. and above, the nickel carbonyl catalyst decomposes very little. Increasing the ratio of water to methanol in the solvent, effects a corresponding adjustment in the ratio of methacrylic acid to methyl methacrylate. As a further consequence of increasing the water content, the amounts of by-products such as methyl isobutyrate, polymeric compounds and high boiling materials are reduced. For instance, at 380° F., 1000 p.s.i.g., and 10% water, the amount of high boiling material produced was only 2.8%. At 360° F., 810 p.s.i.g., and 42% water, the amount of high boiling material was 1.2%. The yields of useful products are very high.

It is also a further feature of this invention that nickel carbonyl production from nickel salts can be satisfactorily carried out in the acidic reaction medium as herein described for Reactor 1.

Typical nickel containing materials which may be useful include nickel acrylate, nickel propionate, nickel isobutyrate, nickel crotonate, nickel benzoate, nickel oleate, nickel naphthenate, chelates such as those of ethylene diamine tetracetic acid, 1,3-pentanedione, and the like. Anions to be avoided include those such as the halides and nitrates which variously present difficulties including tendencies to promote excessive polymer formation, equipment corrosion, and separation and purification problems. In other words, it is entirely unnecessary to add any alkaline or basic substances such as ammonia or an amine to the system in which the required nickel carbonyl is produced. In fact, a nickel salt of an organic acid either added, or formed in situ can function as the source of nickel. The nickel salt of methacrylic acid can be used and may be preferred. It is only necessary that the nickel salt or nickel complex used be substantially soluble in the reaction mixture. Thus, it is particularly useful to employ the by-product of the carbonylation reaction which is produced in Reactor No. 2, the nickel salt of methacrylic acid as the nickel salt for the nickel carbonyl production. For this formation of nickel carbonyl, temperatures above 360° F. up to 400° F. are best employed, since below these temperatures the reaction velocity is very low. Since the catalytic level of the reaction is increased and the rate of nickel carbonyl production is directly proportional to partial pressure of carbon monoxide, it is desirable to operate at as high a carbon monoxide pressure as convenient and yet avoid excessive polymerization. In this embodiment the solvent used must contain an alcohol and an organic acid and at least trace amounts of water to maintain a homogeneous liquid reaction mixture. Organic acids such as acrylic, benzoic, isobutyric, naphthenic, oleic, and the like may be used. Methacrylic acid is preferred. An alcohol such as methanol or ethanol is conveniently employed.

It is also contemplated to be within the scope of the invention to operate the reaction system as a multi-reaction system wherein each reactor operates under favorable conditions to produce at least one reagent for another reactor and in turn receives at least one reagent from another reactor.

Another embodiment of the invention contemplated as a multi-reaction systems comprises one reactor which produce nickel carbonyl in accordance with the process of the invention, and a part or all of this nickel carbonyl is fed to a plurality of carbonylation reactors, a part or all of which would produce and feed methacrylic acid to the reactor producing nickel carbonyl. Likewise, a plurality of reactors can be used to produce nickel carbonyl a part or all of which is fed to one reactor which would produce methacrylic acid in accordance with the process of this invention a part or all of which would be fed to the reactor producing nickel carbonyl.

The above-defined features and elements of the invention will be illustrated in further detail by the more specific examples and embodiments set forth below; however, it is in no way intended to limit the invention process specifically thereto.

EXAMPLE 1

In general, it has been discovered that the index of performance of this two-stage or two-reactor system is the ratio of nickel carbonyl to methacrylic acid. In the first reactor, (Reactor No. 1) the key ratio is $$\frac{\text{nickel carbonyl produced}}{\text{methacrylic acid consumed}}$$

This ratio should be maintained approximately equal to the ratio of $$\frac{\text{nickel carbonyl consumed}}{\text{methacrylic acid produced}}$$

in operating in the second or carbonylation reactor (Reactor No. 2). Maintenance of these ratios dictate the generally optimum operating conditions for the two reactor system.

The process is especially useful when the two ratios are approximately equal. The conditions for balancing the ratios of the two reactors can most easily be achieved by controlling the efficiency of operation of Reactor No. 1, by increasing the production rate of nickel carbonyl and/or decreasing the esterification rate of the methacrylic acid present therein by its recycle from Reactor No. 2.

Experiments have been carried out which have demonstrated that nickel carbonyl formation is broadly directly proportional to the carbon monoxide pressure. Nickel carbonyl formation rates are dependent upon carbon monoxide pressures.

The rate of acid esterification (methacrylic acid consumed) as well as the effect of carbon monoxide pressure on nickel carbonyl formation is illustrated in the following Table I, which details various conditions for several runs of operation of the first stage reactor or Reactor No. 1. (The more methacrylic acid present the more soluble is the nickel methacrylate; Run 3 is high in methacrylic acid which affects the production of nickel carbonyl.)

TABLE I

| Run number | 1 | 2 | 3 | 4 | 5 |
|---|---|---|---|---|---|
| Reaction temperature, °F | 380 | 380 | 380 | 380 | 380 |
| Total pressure, p.s.i.g | 1,000 | 1,000 | 1,300 | 1,200 | 1,500 |
| Nickel methacrylate solution fed: | | | | | |
| Feed rate, g./hr | 520.3 | 530.3 | 464.6 | 492.4 | 493.1 |
| Nickel methacrylate, wt. percent | 2.91 | 4.11 | 4.04 | 4.15 | 4.10 |
| Methacrylic acid, wt. percent | 10.42 | 11.49 | 16.13 | 10.19 | 10.49 |
| Methanol, wt. percent | 85.09 | 83.81 | 79.09 | 85.33 | 84.88 |
| High boiling material, wt. percent | 1.58 | 0.59 | 0.74 | 0.33 | 0.53 |
| Steady state product: | | | | | |
| Liquid product, g./hr | 519.5 | 540.3 | 454.4 | 485.4 | 486.1 |
| Nickel carbonyl, wt. percent | 0.32 | 0.28 | 0.88 | 0.37 | 0.48 |
| Methanol, wt. percent | 80.13 | 77.10 | 70.79 | 78.36 | 77.30 |
| Impurities, wt. percent | | | 0.90 | 0.87 | 0.32 |
| Methyl methacrylate, wt. percent | 11.26 | 11.20 | 17.04 | 9.85 | 9.86 |
| Water-methacrylate, wt. percent | 1.87 | 3.29 | 3.34 | 2.65 | 2.00 |
| Methacrylic acid, wt. percent | 3.00 | 3.39 | 2.93 | 3.17 | 3.06 |
| Nickel methacrylate, wt. percent | 2.38 | 3.47 | 2.49 | 3.30 | 2.90 |
| High boiling material, wt. percent | 1.04 | 1.27 | 1.62 | 1.43 | 3.71 |
| Nickel carbonyl in gas, g./hr | 0.16 | 0.34 | 0.70 | 0.50 | 1.1 |
| Loss, g./hr | 5.78 | 1.7 | | 6.55 | 5.9 |
| Nickel conversion to nickel carbonyl, percent | 18.3 | 15.6 | 39.8 | 21.6 | 30.2 |
| A. Nickel carbonyl formation: | | | | | |
| G./hr | 2.07 | 2.58 | 5.57 | 3.30 | 4.56 |
| mM./hr | 12.1 | 15.1 | 32.6 | 19.3 | 26.7 |
| B. Acid esterification: | | | | | |
| G./hr | 40.7 | 46.3 | | 38.1 | 41.4 |
| M./hr | 0.473 | 0.538 | | 0.443 | 0.481 |
| A/B, mM./M | 25.6 | 28.1 | | 43.6 | 55.5 |

The results of Runs 1, 2, 3 and 4, together with those of Run 5 carried out at the higher pressure of 1500 p.s.i.g. are summarized in Table II below.

TABLE II

| Run Number | 1 | 2 | 3 | 4 | 5 |
|---|---|---|---|---|---|
| Temperature, °F | 380 | 380 | 380 | 380 | 380 |
| Total pressure, p.s.i.g | 1,000 | 1,000 | 1,300 | 1,200 | 1,500 |
| Nickel methacrylate concentration, percent | 2.91 | 4.11 | 4.0 | 4.15 | 4.1 |
| Nickel carbonyl formation rate, mM./hr | 12.1 | 15.1 | 32.6 | 19.3 | 26.7 |
| Acid esterification rate, M./hr | 0.473 | 0.538 | | 0.443 | 0.481 |
| Ratio: $\frac{\text{Nickel carbonyl formed}}{\text{methacrylic acid consumed}}$ | 25.6 | 28.1 | | 43.6 | 55.5 |

The summary of experimental results shown in Table II above show that there exists almost a straight line relationship between the ratio of (nickel carbonyl formed to methacrylic acid consumed) to carbon monoxide pressure. This ratio takes into consideration the requirements of nickel carbonyl for the carbonylation reaction which takes place in Reactor No. 2 and consequently and according to this invention a balance between the two reactors or reaction stages can be maintained.

From Table II above, we see that the ratios of $$\frac{\text{nickel carbonyl formed}}{\text{methacrylic acid consumed}}$$

in Reactor No. 1, vary between 25.6 and 55.5. It should be noted here also that any ratio may be obtained in Reactor 1 by adjusting process variables. Tables I and II illustrate the point that any ratio of feed to product can be obtained for Reactors 1 and 2 by adjusting variables; and more specifically, that the ratios can be made to coincide or substantially equal each other by suitable adjustments.

EXAMPLE 2

A continuous carbonylation run was carried out in the presence of 56% water in the reaction solvent system. The results are shown in the following Table III. Special emphasis was given to level of methacrylic acid produced.

TABLE III

| | |
|---|---|
| Temperature °F | 360 |
| Total pressure p.s.i.g. | 810 |
| Methyl acetylene solution: | |
| Feed rate g./hr. | 222 |
| Methyl acetylene wt. percent | 45.9 |
| Impurities do | 1.4 |
| Methanol do | 52.5 |
| Hydroquinone wt. | 0.2 |
| Nickel carbonyl solution: | |
| Feed rate g./hr. | 139.5 |
| Nickel carbonyl wt. percent | 10.0 |
| Methanol do | 89.6 |
| Hydroquinone do | 0.4 |
| Water solution: | |
| Feed rate g./hr. | 314.5 |
| Water wt. percent | 99.75 |
| Hydroquinone do | 0.25 |
| CO absorption rate g./hr. | 63.0 |
| Total feed rate g./hr. | 739 |
| Water/water plus methanol percent | 56.0 |
| Liquid product g./hr. | 710.2 |
| Nickel carbonyl wt. percent | 0.537 |
| Methanol do | 27.85 |
| Impurities do | 0.423 |
| Methyl methacrylate do | 15.2 |
| Water do | 40.9 |
| Methyl crotonate do | 0.172 |
| Methacrylic acid do | 12.93 |
| Nickel methacrylate do | 0.786 |
| High boiling material do | 1.21 |
| Nickel carbonyl in gas product g./hr. | 5.7 |
| Catalytic level percent | 95.8 |
| Nickel carbonyl decomposed/acid formed mM./M. | 22.9 |
| Yield of methyl methacrylate percent | 42.3 |
| Yield of methyl crotonate do | 0.5 |
| Yield of methacrylic acid do | 41.9 |

From the above continuous run, it is seen that using 56% water in the solvent gives, a relatively high ratio of methacrylic acid to methyl methacrylate, i.e., 41.9 to 42.3; whereas, for instance, using about 20% water in the solvent gives a much lower ratio of methacrylic acid to methyl methacrylate, i.e., 13.3 to 61.4 (see Run 7 in Table IV and Table V). Operating at levels of below about 80% water, the ratio of carbon monoxide consumption to methacrylic acid production increases to undesirably high levels.

EXAMPLE 3

Tables IV and V give detailed information on a series of runs 6 to 16 employing the process of the invention. Temperature, pressure and compositions of various feed stream, as well as compositions of "steady state" product streams and total product streams are presented. These Tables show that there is a direct linear relationship between the actual corrected yield of methyl methacrylate and methyl crotonate and the amount of water in the feed solution to the carbonylation. These results also show that the nickel carbonyl decomposes approximately in proportion to the water content in the feed solution.

These Tables also illustrate a representative range of ratios of $$\frac{\text{nickel carbonyl consumed}}{\text{methacrylic acid produced}}$$

employed in Reactor 2, achieved by adjusting process variables. By "methacrylic acid produced" is meant the amount which is available for reaction in Reactor 1. The ratios obtained in the runs shown in these Tables vary between 26.4 (Run 13) and 50.3 (Run 9). Any ratio, however, can be obtained by making corresponding adjustments in the variables as is obvious from the various runs. In this regard these Tables are meant to be illustrative only of some of the ratios which can be obtained.

TABLE IV

| Run number | 6 | 7 | 8 | 9 | 10 | 11 | 12 | 13 | 14 | 15 | 16 |
|---|---|---|---|---|---|---|---|---|---|---|---|
| Reaction temperature, °F | 360 | 360 | 360 | 360 | 360 | 360 | 360 | 360 | 360 | 360 | 360 |
| Total pressure, p.s.i.g. | 740 | 750 | 750–800 | 800 | 745 | 740 | 740 | 740 | 745 | 740 | 740 |
| Initial charge, g. | 553 | 553 | 553 | 553 | 553 | 553 | 553 | 553 | 553 | 553 | 553 |
| Nickel carbonyl, wt. percent | 4.16 | 4.16 | 4.16 | 4.16 | 4.16 | 4.16 | 4.16 | 4.16 | 4.16 | 4.16 | 4.16 |
| Methanol, wt. percent | 84.9 | 67.40 | 58.59 | 58.7 | 77.52 | 77.5 | 67.99 | 68.94 | 66.22 | 73.04 | 60.16 |
| Water, wt. percent | | 16.89 | 25.10 | 25.3 | 8.62 | 8.62 | 18.35 | 17.18 | 19.80 | 12.97 | 25.97 |
| Methacrylic acid, wt. percent | 10.9 | 11.37 | 11.99 | 12.0 | 9.57 | 9.6 | 9.44 | 9.57 | 9.55 | 9.56 | 9.57 |
| Hydroquinone, wt. percent | 0.11 | 0.17 | 0.16 | | 0.13 | 0.14 | 0.07 | 0.15 | 0.27 | 0.27 | 0.13 |
| Methyl acetylene solution: | | | | | | | | | | | |
| Feed rate, g./hr. | 308.6 | 318.1 | 327.8 | 239.0 | 240.7 | 243.4 | 232.7 | 236.1 | 254.2 | 251.1 | 253.7 |
| Methyl acetylene, wt. percent | 35.3 | 32.81 | 34.68 | 41.8 | 45.9 | 47.2 | 46.3 | 47.0 | 46.3 | 45.0 | 46.3 |
| Methanol, wt. percent | 56.5 | 52.30 | 44.42 | 56.1 | 51.8 | 50.3 | 51.2 | 50.5 | 50.6 | 50.8 | 49.4 |
| Water, wt. percent | 6.28 | 13.11 | 19.03 | | 0.0 | 0.0 | | | | | |
| Hydroquinone, wt. percent | 0.15 | 0.13 | 0.13 | | 0.0 | 0.21 | 0.21 | 0.20 | 0.14 | 0.14 | 0.14 |
| Impurities, wt. percent | 1.78 | 1.65 | 1.75 | 2.1 | 2.31 | 2.38 | 2.33 | 2.37 | 3.05 | 4.10 | 4.21 |
| Nickel carbonyl solution: | | | | | | | | | | | |
| Feed rate, g./hr. | 101.8 | 110.6 | 112.8 | 95.3 | 136.0 | 138.6 | 112.0 | 94.0 | 109.9 | 107.1 | 96.0 |
| Nickel carbonyl, wt. percent | 10.8 | 15.26 | 19.70 | 22.3 | 26.5 | 12.7 | 16.6 | 12.6 | 9.73 | 10.9 | 10.0 |
| Methanol, wt. percent | 80.1 | 67.63 | 56.10 | 77.7 | 73.6 | 87.1 | 83.2 | 87.2 | 90.1 | 88.8 | 89.8 |
| Water, wt. percent | 8.90 | 16.95 | 24.03 | | 0.0 | 0.0 | | | | | |
| Hydroquinone, wt. percent | 0.22 | 0.17 | 0.16 | | 0.16 | 0.25 | 0.27 | 0.23 | 0.23 | 0.24 | 0.12 |
| Carbon monoxide absorption rate, g./hr. | 62.4 | 66.0 | 62.8 | 62.6 | 72.4 | 70.2 | 69.2 | 71.7 | 70.8 | 75.8 | 81.1 |
| Total feed rate, g./hr. | 472.8 | 494.7 | 503.4 | 471.9 | 51.48 | 507.7 | 517.9 | 478.6 | 508.6 | 521.6 | 520.7 |

TABLE V

| Run number | 6 | 7 | 8 | 9 | 10 | 11 | 12 | 13 | 14 | 15 | 16 |
|---|---|---|---|---|---|---|---|---|---|---|---|
| Steady state product: | | | | | | | | | | | |
| Liquid products, g./hr. | | | | 465.9 | | | 512.8 | 458.8 | 504.9 | 500.6 | 497.9 |
| Nickel carbonyl, wt. percent | 1.36 | 1.05 | 1.16 | 2.53 | 4.06 | 2.59 | 1.81 | 1.31 | 1.43 | 1.31 | 0.79 |
| Methanol, wt. percent | 38.1 | 36.99 | 33.90 | 34.5 | 35.3 | 39.5 | 36.0 | 34.0 | 33.5 | 35.8 | 28.7 |
| Impurities, wt. percent | 2.35 | 1.24 | 1.02 | 0.91 | 2.65 | 2.33 | 1.33 | 1.89 | 2.01 | 1.63 | 2.34 |
| Methyl methacrylate, wt. percent | 39.6 | 33.12 | 31.44 | 33.6 | 39.4 | 39.6 | 34.5 | 37.8 | 35.9 | 39.0 | 33.9 |
| Water, wt. percent | 5.37 | 13.18 | 17.47 | 12.5 | 3.82 | 3.84 | 10.7 | 8.73 | 10.8 | 7.54 | 15.1 |
| Methyl crotonate, wt. percent | 7.63 | 5.88 | 4.41 | 4.93 | 7.14 | 6.87 | 5.78 | 6.82 | 5.69 | 6.30 | 5.01 |
| Nickel methacrylate, wt. percent | 0.35 | 0.58 | 0.91 | 1.07 | 0.67 | 0.44 | 0.63 | 0.51 | 0.67 | 0.51 | 0.87 |
| Methacrylic acid, wt. percent | 3.55 | 6.61 | 7.69 | 7.94 | 5.56 | 3.74 | 8.21 | 7.81 | 8.97 | 7.11 | 12.4 |
| Polymer, wt. percent | 1.52 | | | 2.00 | 1.41 | 0.99 | 0.99 | 1.19 | 1.09 | 0.87 | 0.84 |
| Hydroquinone, wt. percent | 0.15 | | | | 0.00 | 0.17 | | | | | |
| Polymer plus hydroquinone, wt percent | | 1.35 | 2.00 | | | | | | | | |
| Gas product, g./hr. | | | | 6.0 | | | | | | | |
| Nickel carbonyl, g./hr. | | | | 3.1 | | | 2.8 | 2.0 | 1.6 | 2.2 | 2.1 |
| Methyl acetylene unreacted, g./hr. | | | | 1.1 | | | | | | | |
| n-Butane, g./hr. | | | | 1.8 | | | | | | | |
| Total catalytic level, percent | 98.3 | 97.0 | 95.9 | 96.8 | 97.8 | 98.5 | 97.8 | 98.4 | 97.7 | 98.4 | 97.4 |
| Ratio: nickel carbonyl consumed / methacrylic acid produced | 35.4 | 32.6 | 37.0 | 50.3 | 47.5 | 46.8 | 29.5 | 26.4 | 29.3 | 30.0 | 32.6 |

EXAMPLE 4

The simplified flow sheet for feed materials and products resulting therefrom in the two-stage reactor system (Reactor No. 1 and Reactor No. 2) is represented schematically by the accompanying figure.

To describe briefly the flow-sheet, there are provided the usual unloading and storing facilitates for raw materials, and a carbon monoxide generator in conjunction with two carbonylation reaction vessels which preferably operate at approximately 800 p.s.i.g. and 360° F. The feed into Reactor 1 comprises methanol (both fresh make-up and recycle by recovery from the system), methacrylic acid, a nickel salt, preferably nickel methacrylate, carbon monoxide from a suitable generating unit, hydroquinone, (a stabilizer and/or anti-oxidant) and unavoidably small amounts of polymers and other impurities which may be introduced from various recycle streams. The product mixture produced in Reactor No. 1 comprises nickel carbonyl, methanol, methyl methacrylate, water, methacrylic acid, nickel methacrylate, polymers and other impurities.

The feed streams to Reactor No. 2 comprise carbon monoxide, nickel carbonyl, methanol (both fresh make-up and recycle), methyl acetylene both recycle and from an outside source, water and hydroquinone or other stabilizer and/or anti-oxidant as required. The product stream from Reactor No. 2 comprises unreacted nickel carbonyl, excess methanol, product methyl methacrylate, water, methacrylic acid for eventual recycle to Reactor No. 1, nickel methacrylate or other nickel salt also for eventual recycle to Reactor No. 1, small amounts of polymers and other impurities and by-products.

The products of Reactor No. 1 in a combined stream with the products of Reactor No. 2 are passed into appropriate product separation unit. This unit is provided with facilities to separate and to pass from its upper portion into Reactor No. 2 the nickel carbonyl produced in Reactor No. 1 as well as unreacted methyl acetylene for recycle.

The remainder of the combined product streams which have been stripped of nickel carbonyl and methyl acetylene, then passes from the product stripper into a flash tank from which there are recovered two or possibly three liquid streams. One stream comprises a mixture of nickel methacrylate or other nickel salt, methacrylic acid, methyl crotonate, and polymers, the desirable products of which are returned to Reactor No. 1, as required. The second stream (and possibly a third stream) comprises nickel methacrylate, some methacrylic acid, and possibly small amounts of methyl crotonate, polymer, and other impurities in varying proportions. This mixture is passed into purification train B from which there is recovered methacrylic acid which is recycled to Reactor No. 1. Also recovered variously from this purification train B is a mixture of impurities comprising some nickel methacrylate, methacrylic acid, methyl crotonate and polymer, which mixture is disposed of outside the system.

The flash stream (the fourth stream from the flash tank) comprises the light ends from the flash tank, methanol, methyl methacrylate, water, methyl crotonate and other volatile impurities. This mixture is passed to purification train A. The methanol is thereby removed for recycle through the system; the product methyl methacrylate is purified to the degree necessary for various polymerization purposes or other uses. Impurities are variously separated from the purification system at the appropriate portions of the purification train.

All distillations (with the possible exception of the methanol) are preferably carried out at appropriate reduced pressures and in the further interest of achieving as high a purity product as possible the material of construction preferred for construction is stainless steel. Concentrations of the products and by-products of the two reactors, recycle rates and rates of flow for make-up streams available and possible separations of reaction products in the purification trains A and B and the like can reasonably be determined by one skilled in the art and they are fully compatible with plant practices and the detailed disclosure presented herein.

What is claimed is:

1. In a carbonylation reaction process in which methyl acetylene is reacted with carbon monoxide and methanol in the presence of nickel carbonyl to produce methyl methacrylate, the improvement which comprises the steps of carrying out the reaction in at least two zones whereby a nickel salt and carbon monoxide are reacted in the presence of methanol and methacrylic acid to produce nickel carbonyl and methyl methacrylate in at least one zone, and carbon monoxide, methyl acetylene, nickel carbonyl and methanol are reacted in a water containing solvent system to produce methyl methacrylate and methacrylic acid in at least one separate second zone and substantially all the nickel carbonyl produced in the one zone is passed to the separate second zone, and substantially all the methacrylic acid produced in the separate second zone is passed to the one zone and recovering methyl methacrylate produced in both of said two zones.

2. The process of claim 1 in which the following ratios are approximately maintained:

$$\text{In Zone 1} \quad \frac{\text{nickel carbonyl produced}}{\text{methacrylic acid consumed}} = \frac{\text{nickel carbonyl consumed}}{\text{methacrylic acid produced}} \quad \text{In Zone 2}$$

3. The process of claim 1 in which the two zones are separate reactors.

4. A process for manufacture of methyl methacrylate which comprises reacting a nickel salt, carbon monoxide, methanol and methacrylic acid in a first reaction system to produce nickel carbonyl and methyl methacrylate, passing said nickel carbonyl to a second reaction system and reacting therein carbon monoxide, methyl acetylene, nickel carbonyl, and methanol in the presence of water to produce methyl methacrylate and methacrylic acid, and passing said methacrylic acid to said first reaction system and recovering methyl methacrylate produced in both the said first reaction system and the said second reaction system.

5. The process of claim 4 in which the level of production of nickel carbonyl in the first reaction system is controlled at least in part by control of the carbon monoxide pressure maintained in the system.

6. The process of claim 4 in which the level of production of methacrylic acid in the second reaction system is controlled at least in part by the amount and method of addition of water to the system.

References Cited

UNITED STATES PATENTS

| | | | |
|---|---|---|---|
| 1,941,111 | 12/1933 | Schleckt et al. | 23—203 |
| 2,881,205 | 4/1959 | Dakli et al. | 260—486 |
| 2,883,418 | 4/1959 | Reppe et al. | 260—486 |
| 3,420,753 | 1/1969 | Happel et al. | 260—486 |

OTHER REFERENCES

Krase, "Carbon Monoxide Reactions," Nov. 1, 1945.

LORRAINE A. WEINBERGER, Primary Examiner

R. D. KELLY, Assistant Examiner

U.S. Cl. X.R.

260—533 A; 423—417